US007011525B2

(12) United States Patent
Mejia

(10) Patent No.: US 7,011,525 B2
(45) Date of Patent: Mar. 14, 2006

(54) ENCODING SYSTEM COMBINING LANGUAGE ELEMENTS FOR RAPID ADVANCEMENT

(75) Inventor: Roberto G. Mejia, San Jose, CA (US)

(73) Assignee: Literacy S.T.A.R., Watsonville, CA (US)

( * ) Notice: Subject to any disclaimer, the term of this patent is extended or adjusted under 35 U.S.C. 154(b) by 222 days.

(21) Appl. No.: 10/616,629

(22) Filed: Jul. 9, 2003

(65) Prior Publication Data

US 2004/0122676 A1   Jun. 24, 2004

Related U.S. Application Data

(60) Provisional application No. 60/394,750, filed on Jul. 9, 2002.

(51) Int. Cl.
*G09B 1/00* (2006.01)
(52) U.S. Cl. ........................................ 434/167; 434/178
(58) Field of Classification Search ................ 434/156, 434/159, 167, 170, 171, 172, 176, 178, 117, 434/118
See application file for complete search history.

(56) References Cited

U.S. PATENT DOCUMENTS

| | | | |
|---|---|---|---|
| 550,563 A | 11/1895 | Pierce, Jr. | |
| 557,307 A | 3/1896 | Foster | |
| 660,255 A | 10/1900 | Kingma | |
| 683,267 A | 9/1901 | Froehlich | |
| 1,230,263 A | 6/1917 | Alexander | |
| 1,286,631 A | * 12/1918 | Hillyard | ...................... 434/170 |
| 1,584,627 A | * 5/1926 | Maino | ......................... 434/159 |
| 2,483,833 A | * 10/1949 | Levin | ......................... 434/159 |
| 3,049,614 A | 6/1962 | McLain | |

(Continued)

OTHER PUBLICATIONS

Applicant is aware of a 3 Cueing System by Marilyn Jager Adams; however, he is unaware of a particular reference and/or dates. A copy of 1 page showing a diagram of the 3 Cueing System is attached.

(Continued)

*Primary Examiner*—Kurt Fernstrom
(74) *Attorney, Agent, or Firm*—Squire, Sanders & Dempsey L.L.P.

(57) ABSTRACT

A system and method for literacy and language instruction that can be practiced with graphophonic word-building blocks, learning activities, software, an electronic device, and educational card/dice/bingo, etc. games with multi-sensory learning that revolves around and ideally combines graphophonic, semantic, and syntactic activity in language/literacy development. Other learning activities such as learning word classes, punctuation, and learning content matter may be included. A chart contains 44 images that represent the 44 sounds of English. Each image can be used as a phoneme cue (Phoneme Cue Image) for both phonemic awareness, phonological activity, and encoding words that may have a proximate display of alternate spellings around the Phoneme Cue Image on the block or card for example. Besides graphophonic encoding, word building activity may also simultaneously focus on building meaning and grammar practice. The activities can be done in a group setting and/or independent practice and learning. The system and methods can be used to teach speaking, listening, reading, and writing skills for both native and foreign languages such as English, Spanish, French, etc. The system and method may be called "ESCALERA," which means ladder in Spanish, implying a stage-like order and development of the units, processes, and goals of a language which is to comprehend and express meaning in oral and/or text language.

3 Claims, 15 Drawing Sheets

U.S. PATENT DOCUMENTS

| | | | |
|---|---|---|---|
| 3,422,549 A * | 1/1969 | Gangaard | 434/167 |
| 3,670,427 A * | 6/1972 | Stolpen | 434/157 |
| 4,007,548 A | 2/1977 | Cytanovich | |
| 4,115,932 A | 9/1978 | Charlesworth | |
| 4,158,921 A | 6/1979 | Stolpen | |
| 4,219,197 A | 8/1980 | Acuff | |
| 4,262,431 A | 4/1981 | Darnell | |
| 4,398,891 A | 8/1983 | King | |
| 4,650,423 A | 3/1987 | Sprague et al. | |
| 4,703,425 A | 10/1987 | Muraki | |
| 4,768,959 A | 3/1988 | Sprague et al. | |
| 4,778,392 A | 10/1988 | Mitchell | |
| 4,846,687 A * | 7/1989 | White et al. | 434/112 |
| 4,914,019 A | 4/1990 | Chu | |
| 4,936,780 A * | 6/1990 | Cogliano | 434/311 |
| 5,057,020 A | 10/1991 | Cytanovich | |
| 5,108,113 A | 4/1992 | Leach | |
| 5,199,714 A | 4/1993 | Harper | |
| 5,203,706 A | 4/1993 | Zamir | |
| 5,275,567 A * | 1/1994 | Whitfield | 434/113 |
| 5,306,153 A | 4/1994 | Foster | |
| 5,429,513 A | 7/1995 | Diaz-Plaza | |
| 5,524,899 A | 6/1996 | Haqedorn | |
| 5,554,062 A * | 9/1996 | Goldsen | 446/124 |
| 5,772,212 A | 6/1998 | Hagedorn | |
| 5,788,503 A | 8/1998 | Shapiro et al. | |
| 5,799,267 A | 8/1998 | Siegel | |
| 5,863,043 A | 1/1999 | Bitner | |
| 5,906,492 A | 5/1999 | Putterman | |
| 5,953,692 A | 9/1999 | Siegel | |
| 5,997,304 A | 12/1999 | Wood | |
| 6,009,397 A | 12/1999 | Siegel | |
| 6,022,222 A | 2/2000 | Guinan | |
| 6,077,080 A | 6/2000 | Rai | |
| 6,148,286 A | 11/2000 | Siegel | |
| 6,227,863 B1 | 5/2001 | Spector | |
| 6,271,453 B1 * | 8/2001 | Hacker | 84/476 |
| 6,358,059 B1 | 3/2002 | Li | |
| 6,375,467 B1 | 4/2002 | Grant | |
| 6,435,504 B1 | 8/2002 | Nightingale | |
| 6,442,523 B1 | 8/2002 | Siegel | |
| 6,544,037 B1 | 4/2003 | Fink | |
| 6,551,110 B1 | 4/2003 | Hastie | |
| 6,685,477 B1 * | 2/2004 | Goldman et al. | 434/172 |
| 6,786,729 B1 * | 9/2004 | Lee | 434/159 |

OTHER PUBLICATIONS

Open Court Reading; Open Court Reading Grade Levels Pre-K-6 and Breaking the Code, Grade Levels 4-Adults; 3 pages; Copyright 2002. URL: SRAONLINE.COM.

Reading/Language Arts—Phonics & Linking Language Cubes & Phonics; date unknown; pp. 13-14 and 25-26. URL: http://www.grades123.com.

ETA Cuisenaire: Reading Rods Making Words Kit, Reading Rods Phonics Word-Building Kit, Reading Rods Sentence Construction Kit, Reading rods Short Vowel Word Families Kit, Reading Rods Alphabet & Phonemic Awareness Kit, Reading Rods Prefixes, Suffixes & Root Words Kit, Reading Rods Color-Coded Literacy Program and Additional Reading Rods Materials; Copyright 2003 ETA/Cuisenaire; 10 pages. URL: http://www.etacuisenaire.com/reading rods/readingrods.jsp.

ETA Cuisenaire: Reading Rods: Available Kits; Contains Target Skillls for Reading Rods Alphabet and Phonemix Aware Kit, Reading Rods Short Vowel Word Families Kit, Reading Rods Phonics Word-Building Kit and Reading Rods Prefixes, Suffixes, and Root Words Kit; Printed Feb. 18, 2002; 1 page. URL: http://www.etacuisenaire.com/rrkits.jsp.

Phono-Graphix Website: "What is Phono-Graphix?"; Contains the following information: The nature of the Code and the Child as a Learner of the Code, The Skillls Needed to Use Such a Code and a Summary of Phono-Graphix Reasearch; Printed Jan. 21, 2001; 5 pages. URL: http://www.readamerica.net.

Phonographix Catalog—Read America Educational Materials 2; Online Catalog—p. 2, Classroom and Clinical Materials; Printed May 4, 2002; 4 pages. URL: http://www.readamerica.net/uscart/cat2.htm.

Phono-Graphix—What is Photographix?; Contains skills, concepts, origination and Ofsted report regarding PhonoGraphix; date unknown; 2 pages. URL: http://www/readuk.com/phonographix.html.

Phonics for English, Reading, Spelling &Writing; Contained information about Orton Phonograms and Program Components; date unknown; 13 pages. URL: http://www.yesphonics.com.

Thrass-It: User Guide—Teaching Handwriting, Reading and Spelling Skills; Copyright 1998 Alan Davies & Denyse Ritchie; PC Version ISBN 1876424 06 0 or Mac Version ISBN 1876424 07 9; 5pages; Published by Thrass (Australia) PTY LTD and Thrass (UK) Ltd.

Thrass: Teaching Handwriting, Reading and Spelling Skills; Copyright Thrass (Australia) PTO LTD and Thrass (UK) LTD; date unknown; 7 pages. URL: http://www.thrass.co.uk/.

Thrass Catalogue 2004; 37 pages. URL: http://www.thrass.com/cat04.htm.

Zoo-phonics Scope and Sequence and An Introduction to Zoo-phonics; date unknown; pp. 1-5 and 13-21.

Zoo-phonics Unit 2—Focus: Learn More About the Animals, "Come Meet Us at the Zoo," and Introduce "Left to Right, Up and Down" and Spelling Unit #2; Copyright 1999 by Zoo-phonics, Inc.; pp. 15-26 and 47-56.

Zoo-phonics, Inc. Educational Representative employment posting, employment agreement and application for employment; date unknown; 7 pages.

Zoo-phonics, a learning game that works; date unknown; 9 pages.

Zoo-phonics 2000 Catalog & Workshop Information; 24 pages.

McCarty, Roxanne H.; "Reading Therapy Project"; Project Site: U.S. Dept. of Justice, Federal Bureau of Prisons Federal Correctional Institution, Ray Brook, NY; date unknown; 4 pages.

Head-Dyla Candace; "Bernadillo County Juvenile Detection Center Education Unit Report"; BCIDC/APS Education Unit, Albuquerque, Nm; date unknown; 1 page.

Woodward, Frances; "Clinical Implementation For Reading and Spelling Improvement with Clinical Notes"; Brook Knoll Elementary School; date unknown; 1 page.

Duncan, Erin; "Brook Knoll Elementary School Reading Assistance Pilot Project"; date unknown; 1 page; Advantage Learning Services, Scotts Valley, CA.

Montoya, Mary Jo; "Florence High School Reading Grant"; date unknown; 1 page.

Shearer, Grant; Sunderland Reception Year Pilot Study (Interim Repotr); date unknown; 1 page.

McGuinness, Carmen and Geoffrey McGuinness; "Research A Short Report on Phono-Graphix Clinical and Classroom Application on British School Children"; date unknown; 1 page.

Lore, Pam; "Moon Hall Dyslexia Pilot Study"; Moon Hall School, Surrey, England; Study ran from Sep. 1999 until Mar. 2000; 1 page.

"Read America, parenTeach magazine and HomeGrownChild.com are pleased to provide HomeGrownChild classes for parents"; date unknown; 1 page.

"Read America's Language Wise Certification Programme for Teachers and Therapists"; Read America, Mount Dora, Fl; date unknown; 2 pages.

Phono-Graphix in the US; Phono-Graphix 2 Course Syllabus; About Our Phono-Graphix Referral Service; Summary of Phono-Graphix Research; Summary of Gainesville Reading Groups Study; International Newspaper Articles and Television Shows; Geoffrey & Carmen McGuinness, Innovators of the theories underlying Phono-Graphix; date unknown; 18 pages.

What Makes the Zoo-phonics Program Different? Zoo-phonics Essences; date unknown; 3 pages.

Zoo-phonics Workshop Descriptions, Schedules and Registration From Links; date unknown; 2 pages.

* cited by examiner 1.2
1.3
1.4
1.5 — 149   ②  ← 150
         151

152
acorn 1.2
1.3
1.4
1.5   ②

7.5   ㉓

1.2
1.3
1.4
1.5   ②

| 21 |  |  | a-te, eigh-t (#8) |
|----|----|----|----|
| 23 |  |  | ai-d<br>ai-de |
| 24 |  |  | a-che |

AaBbCcDdEeFfGgHhIiJjKkLlMmNnOoPpQqRrSsTtUuVvWwXxYyZz (S   a   t   ur   d   ay)

1. Wh-e-n

ENCODING SYSTEM COMBINING LANGUAGE ELEMENTS FOR RAPID ADVANCEMENT

RELATED U.S. APPLICATION DATA

This application claims priority to and incorporates by reference Provisional Application No. 60/394,750, filed on Jul. 9, 2002, and incorporates by reference Disclosure Document No. 523,502, filed on Dec. 12, 2002.

BACKGROUND

1. Field of the Invention

The present invention relates to reading and writing, and specifically relates to a system and method of encoding (writing) and decoding (reading) sounds of a language for the purpose of transferring word meaning/knowledge back and forth between oral and academic language.

2. Brief Description of the Prior Art

Alphabet blocks have been used as a learning tool, but they teach a phonetic alphabet, while the English language, especially, along with many other languages, is not phonetic. So the lack of definite logic to the sound-letter correspondence is a serious barrier for literacy learning. As a logic or generalization, with most languages, there is no one-to-one correspondence between the symbols used and the sounds they represent. A second essential issue of the problem is that text language and oral language have very different formats and environments. Children learn their first language orally and nearly automatically, but often have great difficulty when it comes to reading and writing for comprehension. Symbols such as visible letters are the immediate "surface" code for text, while invisible sounds are the immediate code for oral language. It would seem logical that sounds should be more difficult to manage since they are invisible while letters are so obvious to observe since they are visible. However, oral language is typically practiced in meaning-rich situations by which meaning can be derived by associating meaningful phenomena to a particular series of sound-coded oral expressions (words). For example, meaning in oral language is communicated not only by speaking, but by factors such as nonverbal communication. A wider avenue for associating comprehension to sound-coded words can come from sources such as the location of a conversation, the relationship between communicators, the time of day, and tone of voice. Oral language can be learned not only by listening but also by observing a wider variety of cues in the environment compared to text language where pictures and a series of letter symbols (such as illustrated books) give oral language little competition.

The standard approach that has been practiced is teaching a brand of phonics that teaches learners that letters make sounds. This approach leads to many overgeneralizations and does not even monopolize on the oral nature of language by putting the cart (letters) before the horse (sounds). Sounds (sound-codes) move meaning in oral language. Sounds are a kind of currency for trading meaning in spoken language. A kind of glue binds meaning to sound code in oral language. So the phonemic (sound) nature of language must be appreciated and accommodated for in all language and literacy learning. Learning beginning with the letter starts off in unfamiliar territory. The letter as the starting point (is often the ending point in the case of failure-like a trap) is supposed to cue to the sound. For new learners, this means that something you don't understand (letters) is supposed to lead you to something that you do understand (sounds). It is much better to go from the known to the unknown in case of a need to retreat back to the familiar to lick wounds and venture forth later. Add to this the inconsistency of the unpredictable sound-letter correspondence and learning to read and write comprehensively is truly an effort. The idea that letters make sounds does not accurately reflect the invention of the alphabet nor does it aid its practice. Sounds existed before the concept of alphabetic letters, since oral language is natural, but literacy (the alphabet) is unnatural as it was invented.

Imagine that long before any visual symbols were ever etched onto the ground or painted onto a tree or stone face, sounded expressions existed as rudimentary forms of language, which eventually evolved into comprehensible and socially practiced and shared vocabulary. So a member of a language group is used to at least hearing but also speaking language in a sound code as a cause that affects a memory recall connecting the sound-coded words to a meaningful association. Thus, when a learner attempts to learn to read and write, the letters make sounds approach is an extremely poor introduction to learning to read and write. This is why many dislike reading and have even less affection for writing. Visual symbols such as the alphabet have no initial association with meaning or the sound code since sound is the main partner for meaning association for a non-literate learner in terms of language. A beginning learner's comprehension starts at zero with non-sound visual letters. Instead of using the strength of ability and familiarity, the reading learner is hindered.

Acquiring reading skill by simply learning to read is an approach that works against the oral nature of language. It can too often be laborious, boring, unrewarding, and detrimental for many learners, since self esteem can drop after repeated attempts followed by repeated failure. The way reading is typically taught involves unfamiliarity, then the reader has to work their way backwards (back to their instinctual listening ear for the sounds of their sound-coded reality), so finally the symbol(s) is associated to the sound. Then, the reader goes to the next symbol in a word then backwards again to search for the sound that was the effect of the letter, then back and forth, etc., kind of like a clumsy saw running back and forth cutting through wood compared to a rotating electric saw that goes in one direction and loses little time and energy. Interestingly, if letters make sounds, why does a learner have to search for that sound?

Developments in this field include Reading Rods® made by ETA Cuisenaire®. These devices are connectible colored rods that have letters, letter patterns, or whole words. These rods are used with illustrated activity cards. An example is, two rods are illustrated next to a picture of a cake. The second rod "ake" is printed on the card while the first rod depicted on the card has no letter on it. Zoophonics® uses a system where an animal (a particular animal is used for it's name based on the initial sound of that name, which is a particular phoneme) is drawn in the shape and vicinity of each of the 26 letters. Read America Inc. has a method called Phono-Graphix®. This method teaches that letters and letter patterns are pictures of sound. Small printed squares contain a letter or letters. These printed squares are combined to form words.

SUMMARY

Embodiments of the invention will build a visual phonological bridge that allows a learner to use their oral language skills and comprehension to use and transfer those advantages into learning and productive encoding activity. The Phoneme Cue Images will be associated to and will represent phonemes for the purposes of encoding activities and practicing the alphabetic code with lesson activities, games, etc. Ideally, when a Phoneme Cue Image is viewed, it will recall the phoneme into working memory. A decimal reference number or other direction can direct a learner to which letter/letter pattern to encode a phoneme into. When possible, graphophonic encoding will be done in an environment that utilizes and creates syntactic and semantic development. The Graphophonic Blocks and other learning tools of the system allow oral language comprehension to merge with elements of text language such in a multi-sensory approach so that sound and spelling units can be simultaneously manipulated in-hand, recalled to working memory, and visualized as both sound units, spellings, and comprehension are encoded into text. The gears of the system have maximum engagement when the Phoneme Cue picture is used to encode a spelling pattern from within a word that is part of a larger sentence expression that is partially or fully known due to oral language connection. For example, for a lesson activity, imagine a learner viewing a picture of a rabbit running. A learner can determine it is a rabbit and it is running. The oral words and the meaning of the items "rabbit" and "running" or "runs" will likely come to the learner's mind. A predetermined sentence, instructed with the decimal reference number for example can direct the learner to write for example, "The rabbit is running." This sentence can be encoded as a syntactically correct and meaningful expression. An instructor, audiotape, or software audio-video sample can also provide an oral language expression to be written thus connecting meaning for the learner so that expressions can be likewise encoded. The intent is to directly learn to write comprehended and correct language and to allow indirect reading learning as a bonus. The competent writer as a reader should expect and instinctively connect and find the meaning in text language upon decoding, since productive and involved encoding was practiced during, initiated by, and glued to already comprehended language.

BRIEF DESCRIPTION OF DRAWINGS

FIG. 6b shows an exploded view of FIG. 6a.

DETAILED DESCRIPTION OF THE DRAWINGS

Figure 1:
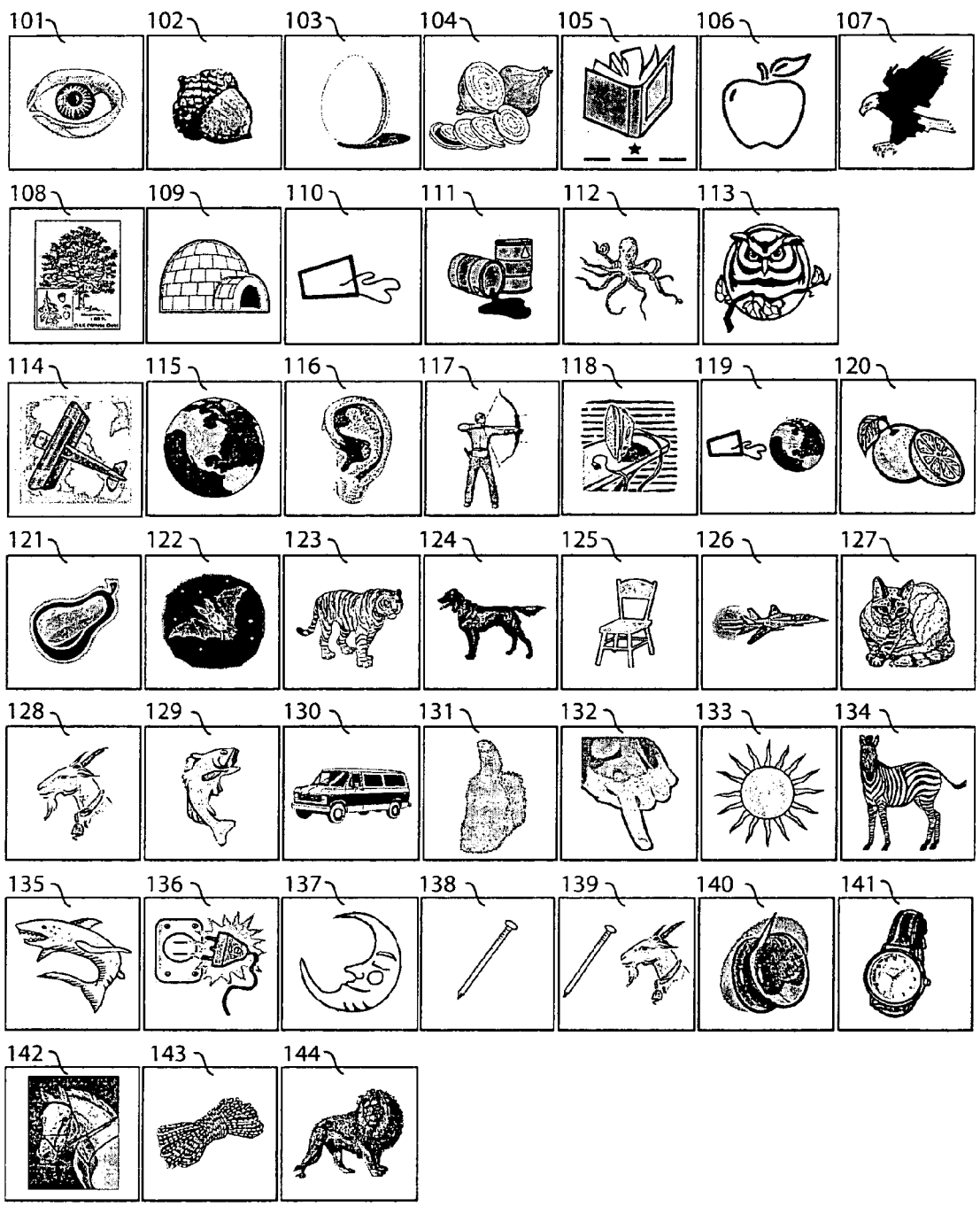
FIG. 1 shows a chart of the 44 Phoneme Cueing Images that each represent on of the 44 phonemes in the English language.

FIG. 1 is a display the 44 Phoneme Cueing Images that each represent on of the 44 phonemes in the English language. The majority of the Phoneme Cue Images 101–104, 106–118, 120–135, 137, 138, and 140–144 represent the first phoneme of the word. Two Phoneme Cue Images 101, and 116 have only one sound so learners can be instructed of this. Other unique Phoneme Cue Images include 105 /u/ the middle sound of book, 110 representing the phoneme /oo/ of "oops," 118 representing the phoneme /ire/ of iron, 119 representing the /oo-er/ such as in entrepreneur by combining 2 Phoneme Cue Images, 136 that represents the phoneme /zh/, and 139 similar to 119 representing /ng/ with 2 images.

Figure 2:
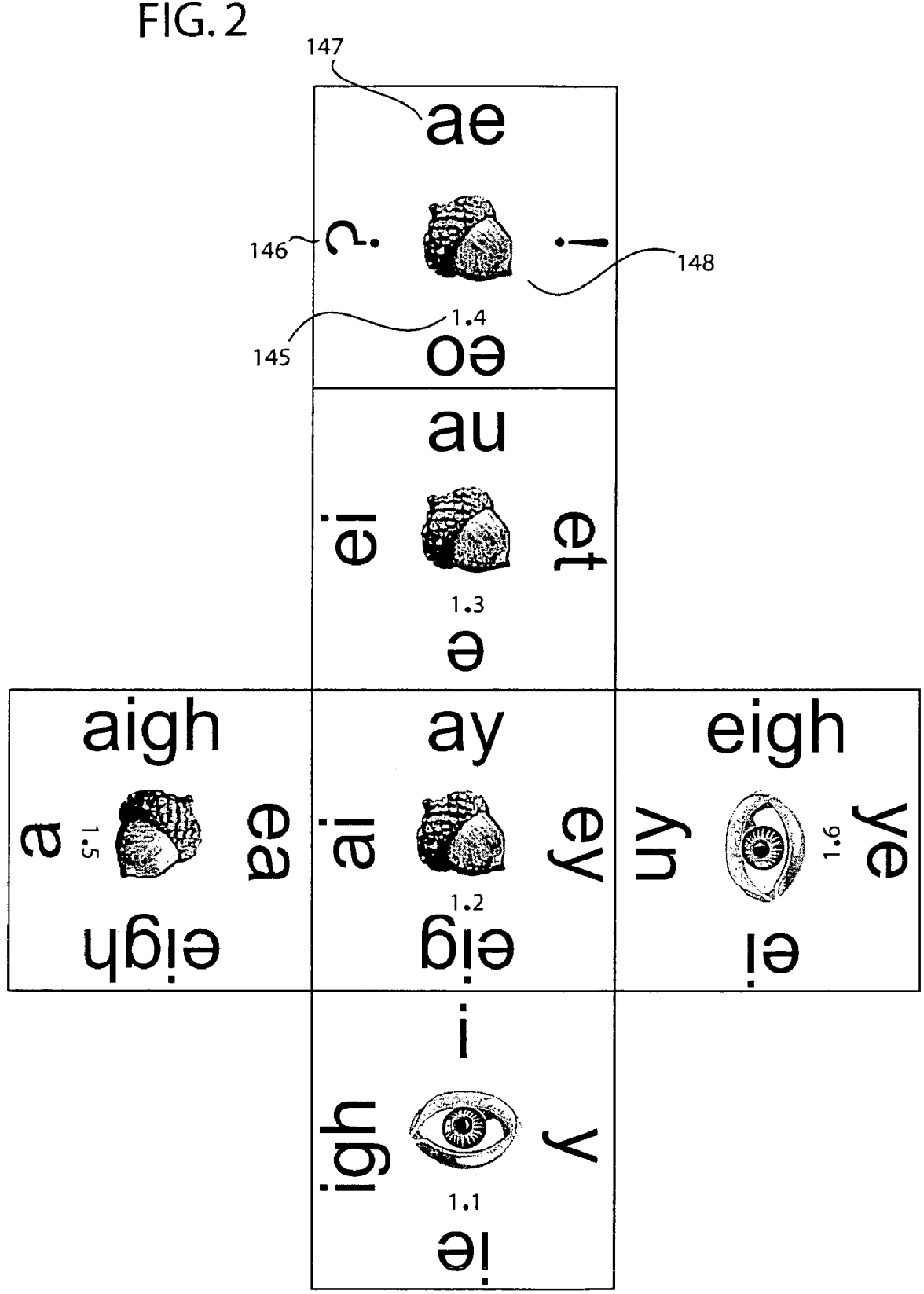
FIG. 2 shows one of the 12 Graphophonic Blocks.

FIG. 2 shows an embodiment of current invention that is one of 12 Graphophonic Blocks used to represent sound units, then to spell each sound unit within a word that is being written. The Decimal Reference Number 145 is used to identify each Graphophonic Block out of the twelve where the whole number represents which block of the 12 to locate, while the tenths of the Decimal Reference Number is used to locate the face of Graphophonic Block. The decimal in the Decimal Reference Number is colored red and is used to orient the block face to a North, West, South, or East position. The Phoneme Cue Image 148 is surrounded by the alternative spellings 147 for that Phoneme to be encoded. Punctuation 146 can also be learned with the Graphophonic Blocks. Blocks may be produced cheaply by printing them on index paper then laminating them, printing on gummed paper, or printing then adhering them to a cube, or they can be printed onto white plastic cubes. The ideally dimensions are two inches cubed.

Figure 3:
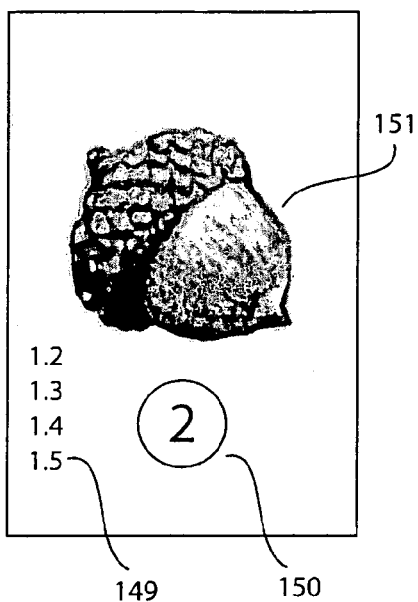
FIG. 3 shows one of the 44 learner flashcards.

FIG. 3 shows one of the 44 learner flashcards used to practice the Phoneme Cue Picture 151. A circled number 150 identifies the flashcard and said number can also be used to order flashcards for phonemic awareness/phonological activity. For further reference and novel use, the Decimal Reference Numbers 149 corresponding to the Graphophonic Blocks are displayed on the flashcard.

Figure 4:
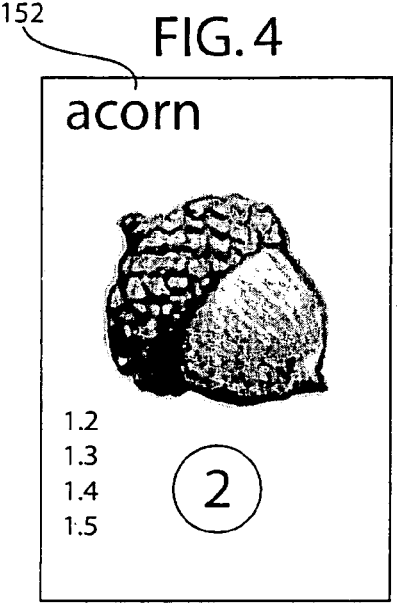
FIG. 4 shows one of the instructor flashcards.

FIG. 4 shows one of the instructor flashcards that has one addition that is the word 152 representing the Phoneme Cue Picture. The word of the Phoneme Cue Image is not intended for learner flashcards since they should avoid overly associating the spelling of this word to the phoneme.

Figure 5:
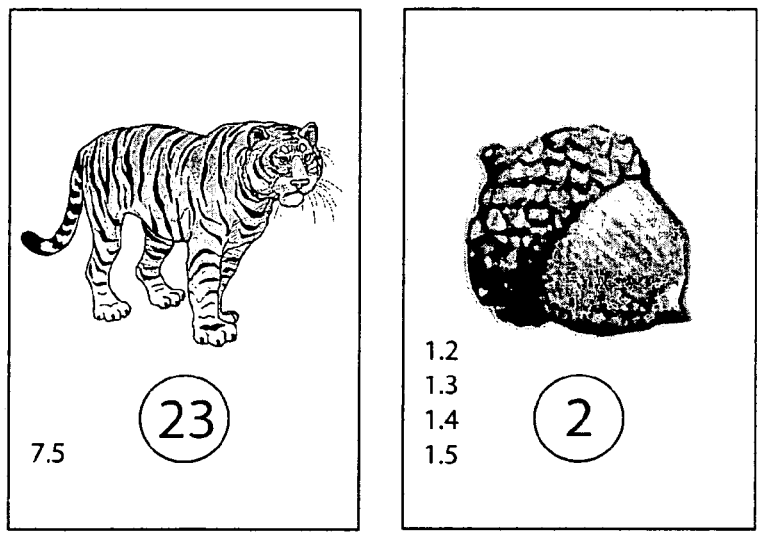
FIG. 5 shows a demonstration of a phonemic awareness activity of the word "eight".

FIG. 5 shows a demonstration of a phonemic awareness activity of the word "eight."

Figure 6A:
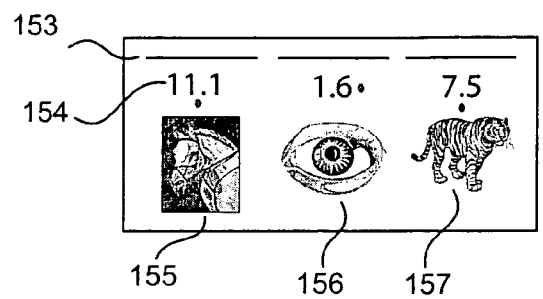
FIG. 6a shows an example of a writing activity exercise.

FIG. 6a shows an example of a writing activity exercise where a Spelling Line 153 is provided to write the spelling for the phoneme. Underneath said line is the Decimal Reference Number 154 that directs the learner to use the Graphophonic Block that also matches said Decimal Reference Number. Phoneme Picture Cues 155–157 representing the sounds /h/ai/t/ for the word "height."

Figure 6B:
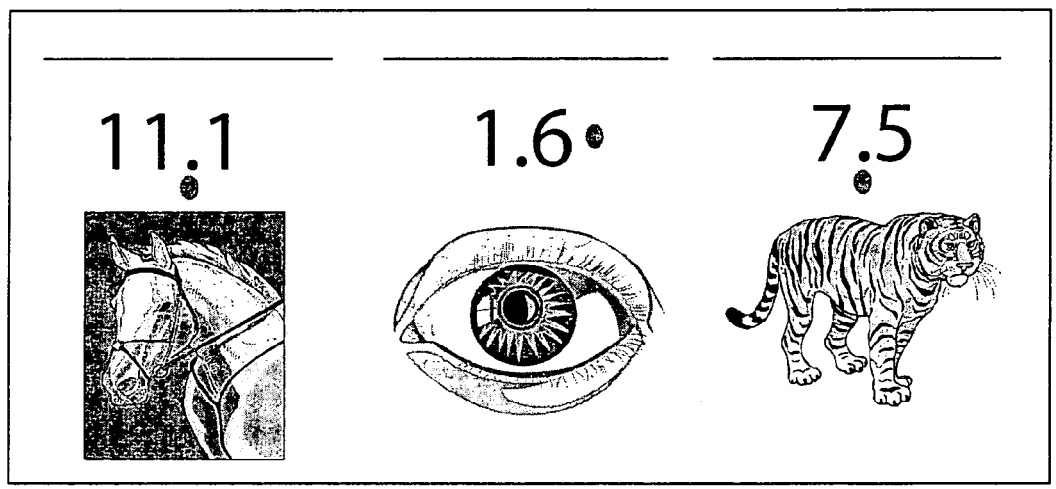

FIG. 6b shows an exploded view of FIG. 6a

Figure 6C:
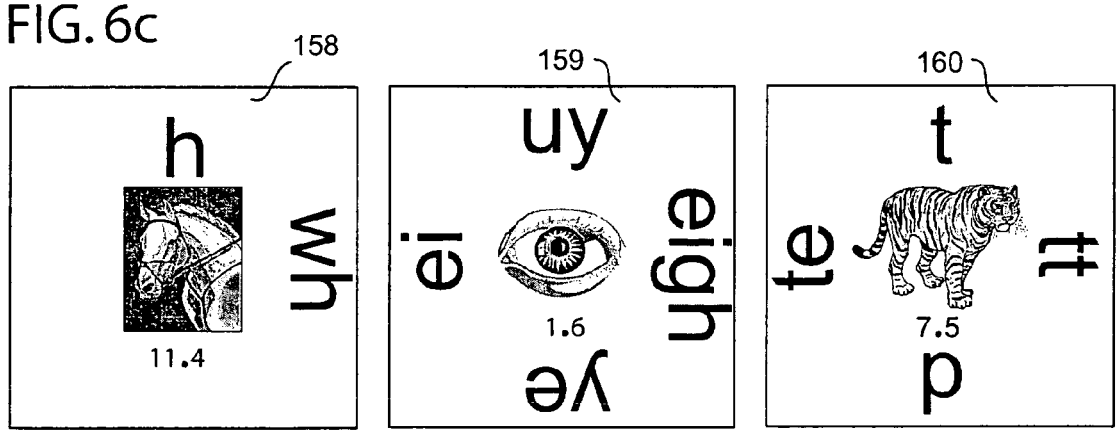
FIG. 6c shows three Graphophonic Blocks.

FIG. 6c shows three Graphophonic Blocks where two Graphophonic Blocks 158 and 160 are in the correct position to reveal the correct spelling for their respective phonemes while the center Graphophonic Block 159 needs adjustment.

Figure 6D:
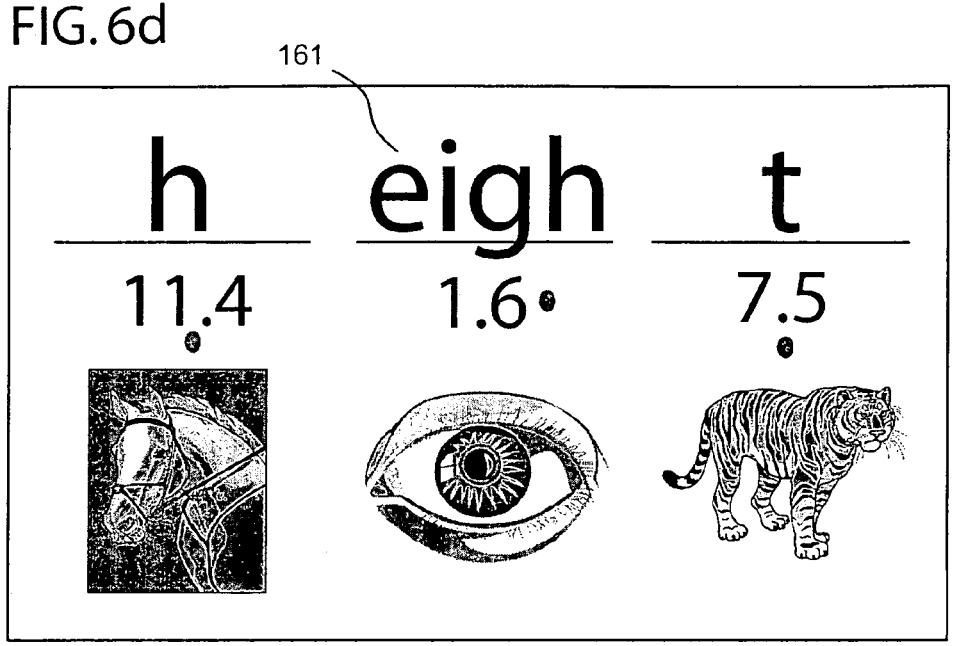
FIG. 6d shows a writing activity exercise.

FIG. 6d shows the writing activity exercise completed where the spelling 161 is written.

Figure 6E:
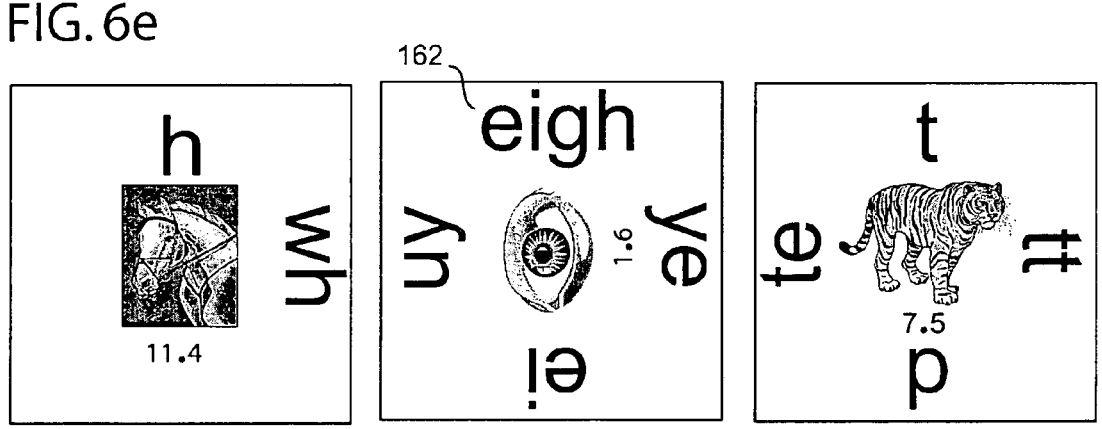
FIG. 6e shows Graphophonic blocks properly arranged.
Figure 6F:
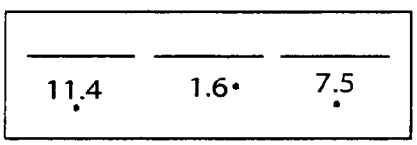
FIG. 6f shows an alternative level of assistance for the writing activity.

FIG. 6e shows Graphophonic blocks properly arranged where the center block 162 has been rotated according to red dot of Decimal Reference Number under said Spelling Line FIG. 6f shows an alternative level of assistance for the writing activity without a Phoneme Cue Image.

Figure 6G:
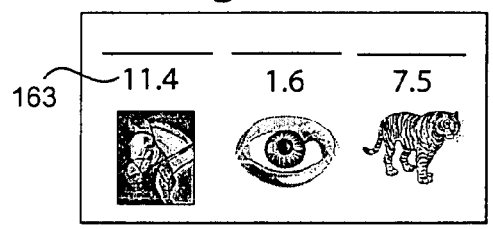
FIG. 6g shows an alternative level of assistance for the writing activity.

FIG. 6g shows an alternative level of assistance for the writing activity without the red dot 163 of the Decimal Reference Number.

Figure 6H:
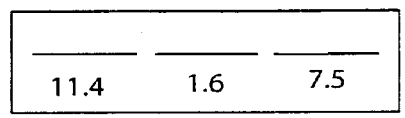
FIG. 6h shows an alternative level of assistance for the writing activity.

FIG. 6h shows an alternative level of assistance for the writing activity with as in FIG. 6g but without Phoneme Cue Image.

Figure 6I:
FIG. 6i shows an alternative level of assistance for the writing activity.

FIG. 6i shows an alternative level of assistance for the writing activity with only the Phoneme Cue Image.

Figure 7:
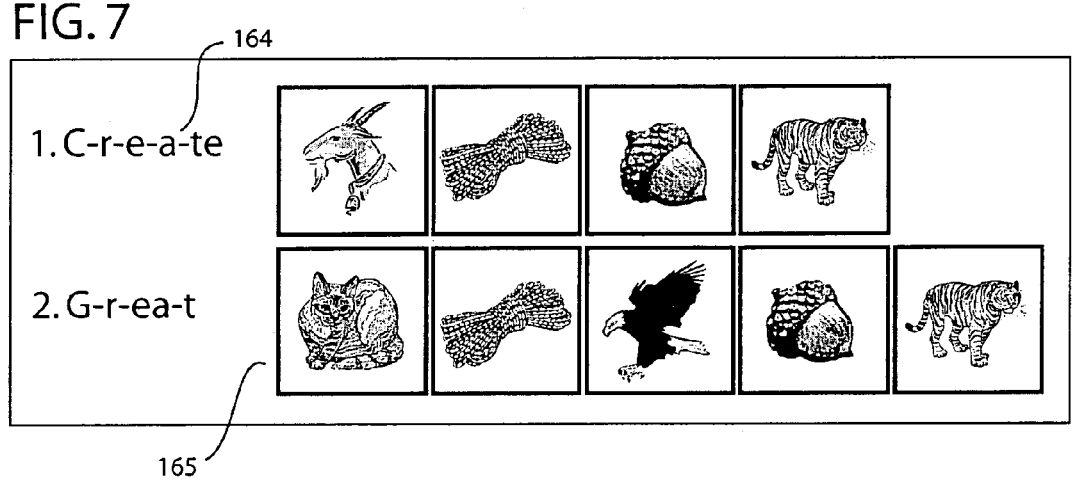
FIG. 7 shows a Graphophonic word-matching activity.

FIG. 7 shows a Graphophonic word-matching activity where the written word "c-r-e-a-te" 164 can be matched via a drawn line to the Phoneme Cue Image representation 165 of said word. Said word can be rewritten after word-match for sound-letter correspondence learning.

Figure 8:
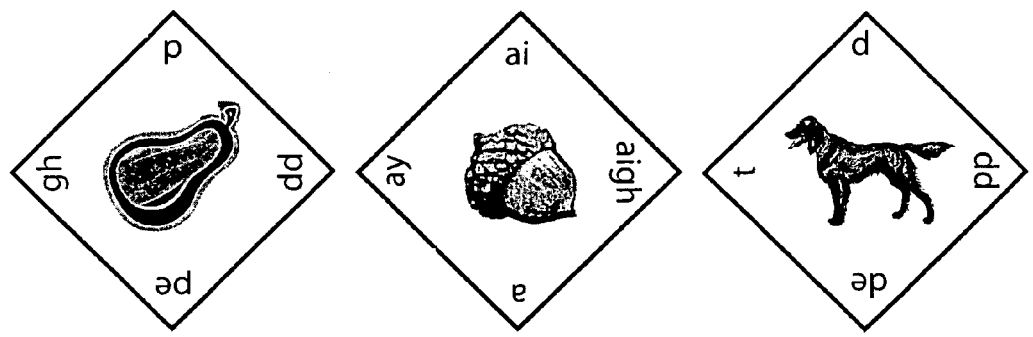
FIG. 8 shows a Graphophonic word-building card game.

FIG. 8 shows a Graphophonic word-building card game playable like poker, rummy, etc., where purpose of said game is to build words that are both correct according to blended Phoneme Cue Images and spellings used.

Figure 9A:
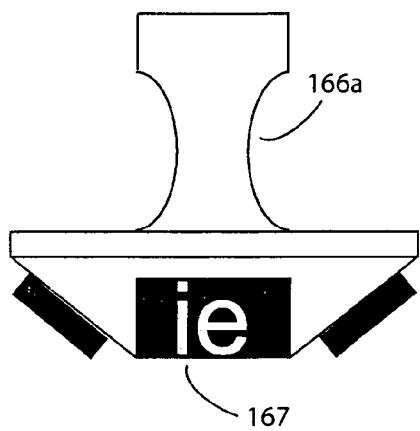
FIG. 9a shows a side view of a Graphophonic Stamp.

FIG. 9a shows a side view of a Graphophonic Stamp made of wood or plastic with a handle 166a and rubber stamp surface at 45 degree angle so that only one spelling will be stamped upon inking for imprinting each spelling 167 for children that have poor orthography skills.

Figure 9B:
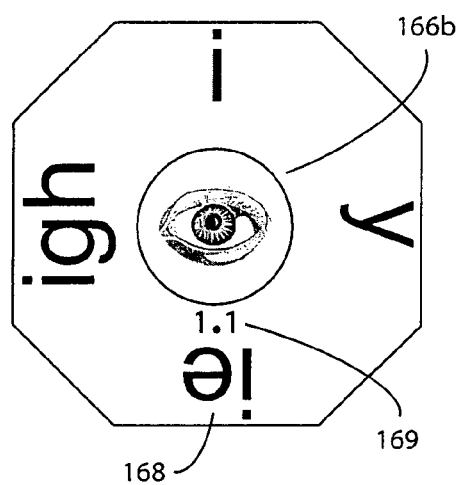
FIG. 9b shows a top view of a Graphophonic Stamp.

FIG. 9b shows a top view of a Graphophonic Stamp with the Phoneme Image Cue 166b and the Decimal Reference Number 169 can be used to find the correct spelling 168.

Figure 10A:
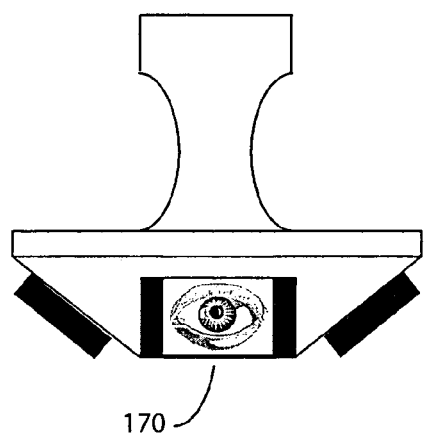
FIG. 10a shows a side view of a Phoneme Cue Image stamp.

FIG. 10a shows a side view of a Phoneme Cue Image stamp (one of 11, for a total of 44 Phoneme Cue Image) similar to previous embodiment except that this stamp imprints the Phoneme Cue Image for spontaneous lesson activities creation.

Figure 10B:
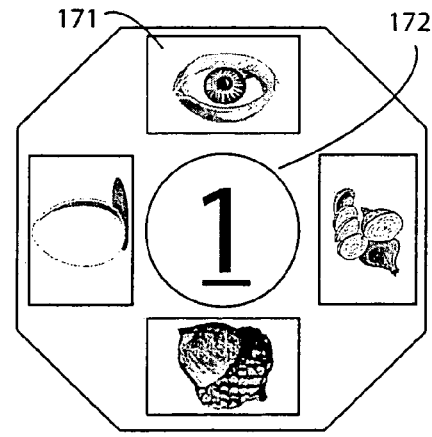
FIG. 10b shows a top of a Phoneme Cue Image stamp.

FIG. 10b shows a top of a Phoneme Cue Image stamp with numbered 172 handle top to help locate stamp for stamping Phoneme Cue Images 171.

Figure 11:
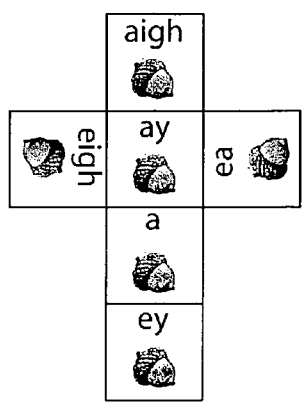
FIG. 11 shows a Graphophonic Die.

FIG. 11 shows a Graphophonic Die used for word building game wherein a plurality of different die are rolled to build words.

Figure 12:
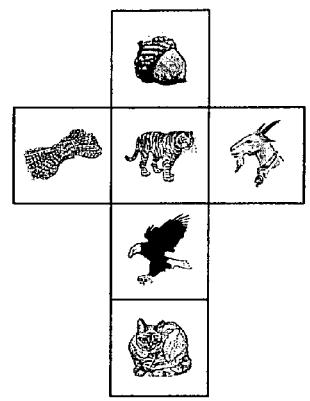
FIG. 12 shows a Picture Cue Image Die.

FIG. 12 shows a Picture Cue Image Die for Phonemic and Phonological awareness and word-building activities.

Figure 13:
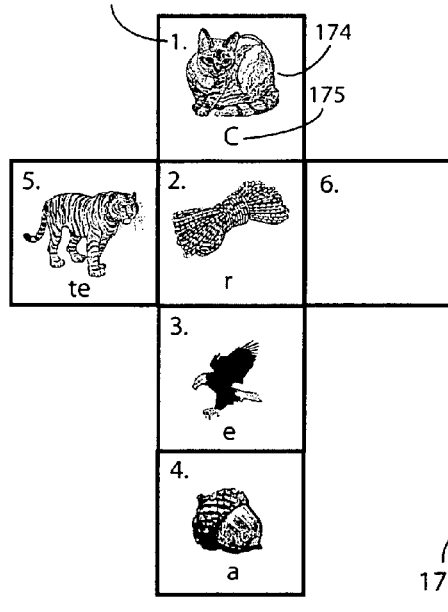
FIG. 13 shows a Graphophonic Word-Building Die.

FIG. 13 shows one Graphophonic Word-Building Die that is used to build a single word. Multiple dice may be used to build short sentences. Starting on the No. 1 face 173 the Phoneme Cue Image 174 assists in pronunciation and sound-letter 175 correspondence learning.

Figure 14:
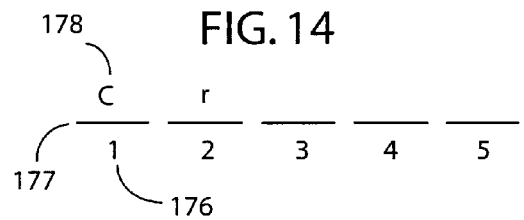
FIG. 14 shows a writing activity demonstration for the item of FIG. 13.

FIG. 14 shows a writing activity demonstration for the item of FIG. 13 where according to the die face 176, a Spelling Line 177 is provided for the letter(s) are written 178.

Figure 15:
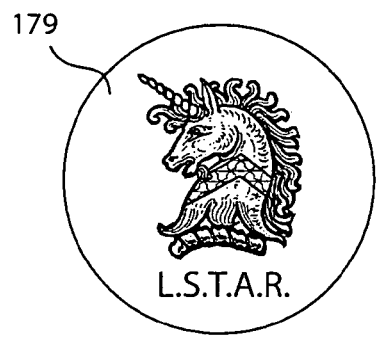
FIG. 15 shows a Game Piece for a Phoneme Bingo Game.

FIG. 15 shows a Game Piece 179 for a Phoneme Bingo Game.

Figure 16:
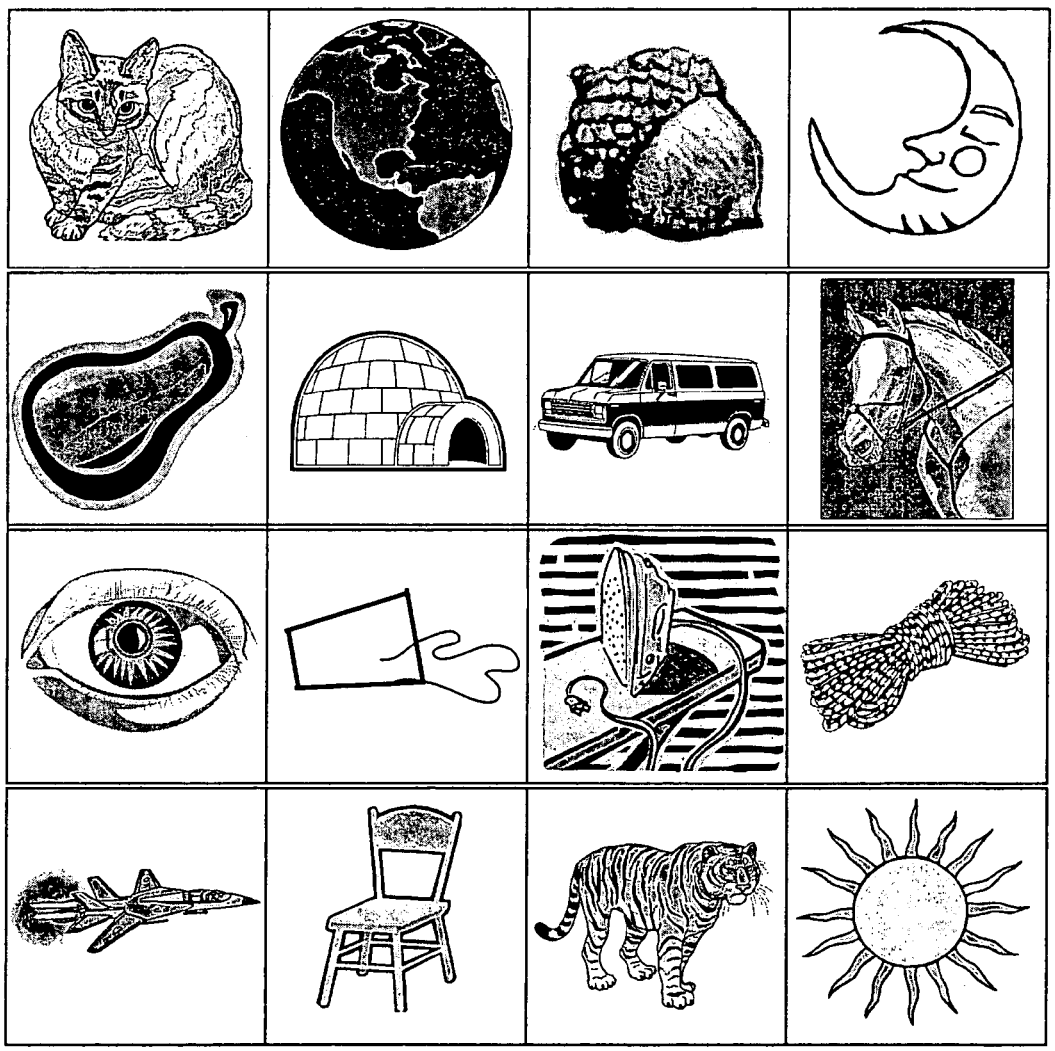
FIG. 16 shows a Phoneme Bingo Game.

FIG. 16 shows a Phoneme Bingo Game that is played like regular bingo except that a phoneme is called out for players.

Figure 17:
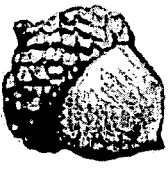
FIG. 17 shows three entries in a Graphophonic Spelling Dictionary.
Figure 17:
Figure 17:
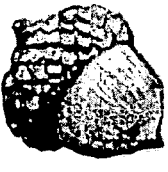
Figure 17:
Figure 17:
Figure 17:

FIG. 17 shows three entries in a Graphophonic Spelling Dictionary that is used by learners to locate the spelling of a word 183 they'd like to write or correct. Looking down the columns of the Phoneme Cue Pictures 108 and 181, to find the correct word. (For simplified demonstration of this embodiment, two-phoneme words are used.) User would run their finger down the second column 182 since this second column makes the word unique until they find the word. This spelling dictionary could have the 300–1000 most common words for learners to look up then write. A lower and upper case alphabet 184 is displayed in case the writer needs to capitalize the word.

Figure 18A:
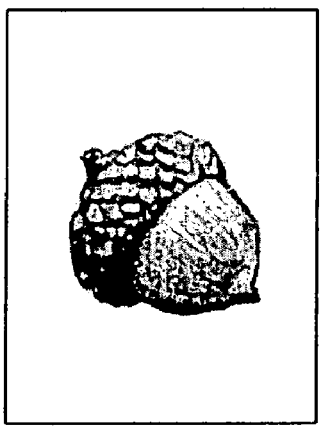
FIG. 18a shows the front of a card from a Graphophonic Fish Game.

FIG. 18a shows the front of a card from a Graphophonic Fish Game with the /ay/ Phoneme Cue Image. This game is played by picking up cards to build a word then replacing them if not successful. All players must show the cards they pick up at all times.

Figure 18B:
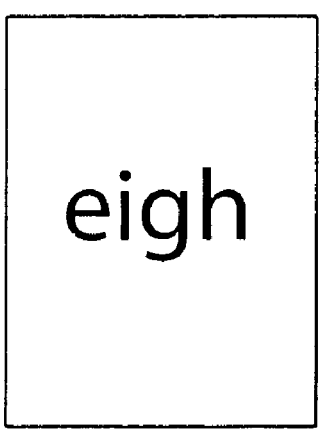
FIG. 18b shows the rear of a card from a Graphophonic Fish Game.

FIG. 18b shows the rear of a card from a Graphophonic Fish Game shows the spelling available to build a word as word must be phonemically correct and spelled correct also.

Figure 19A:
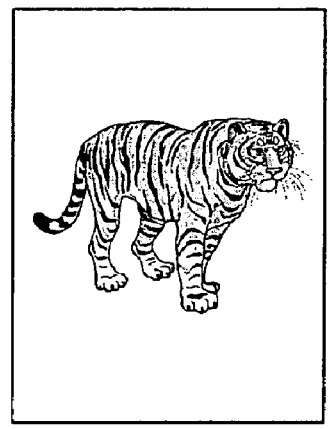
FIG. 19a shows the front of a card from a Graphophonic Fish Game.

FIG. 19a shows the front of a card from a Graphophonic Fish Game with the /t/ tiger Phoneme Cue Image that with the /ay/ acorn Phoneme Cue Image can be used to for the words "eight" or "ate."

Figure 19B:
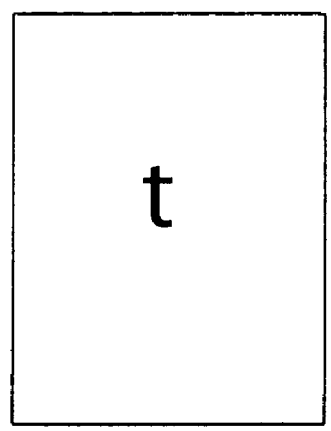
FIG. 19b shows the rear of a card from a Graphophonic Fish Game.

FIG. 19b shows the rear of a card from a Graphophonic Fish Game showing this card can be combined with card from FIGS. 18a/18b to build the word "eight."

Figure 20:
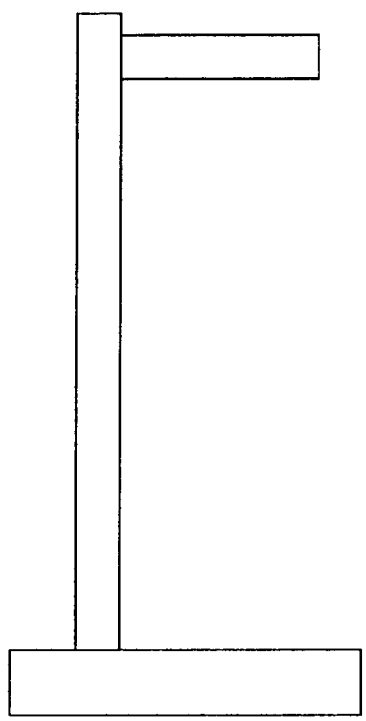
FIG. 20 shows a Graphophonic Hangman Game.
Figure 20:
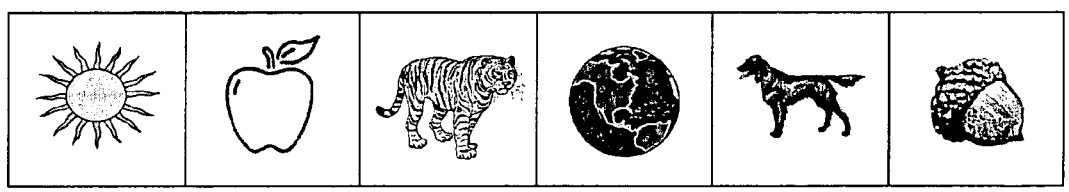

FIG. 20 shows a Graphophonic Hangman Game where Phoneme Cue Images are placed under Spelling Lines and Children can guess each of the spellings or game may start from scratch and players may call out one of 44 Phoneme Cue Images to phonetically determine word.

Figure 21:
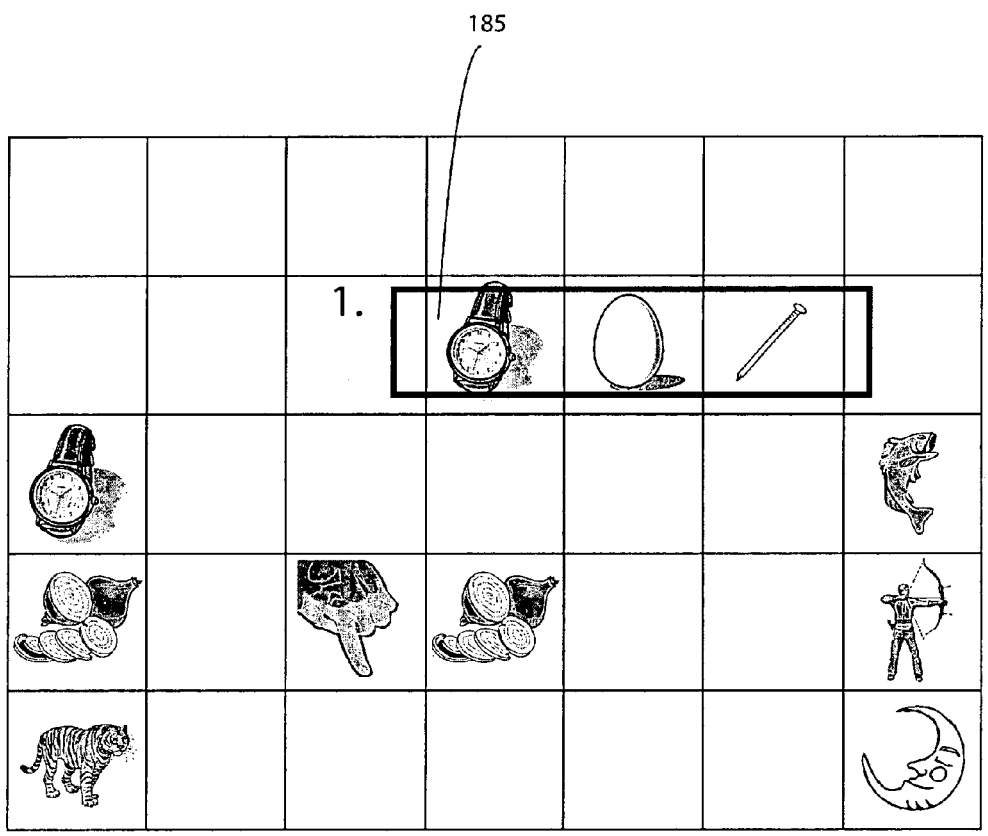
FIG. 21 shows a Graphophonic Word Search Game.

FIG. 21 demonstrates a Graphophonic Word Search Game where the word "when" 185 has been found and circled.

Figure 22:
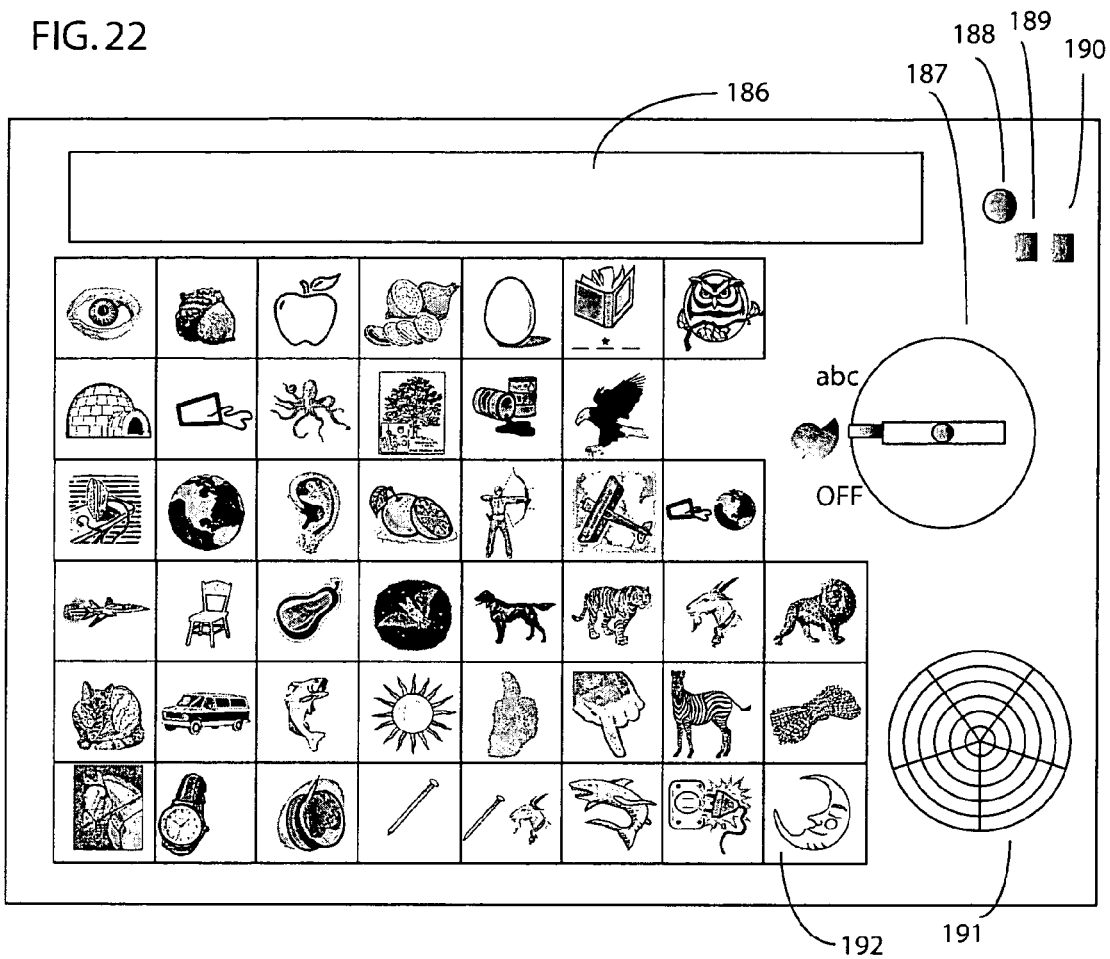
FIG. 22 shows an ESCALERA Electronic Device.

FIG. 22 shows an ESCALERA Electronic Device with a speaker 191 that can produce the Phoneme sounds and the learner can hit the appropriate button 192 to learn the Phoneme Cue Image system for literacy activities. The rotating selector dial 187 can select between Phonemic awareness/Phonological activities such as producing a series of sounds or saying a word then requiring the user to hit the correct buttons in order to reproduce the same sounds or to select the phonemes from a blended oral word. Spelling activities with the Phoneme Cue Image system are available similar to other embodiments in this application. There are left 189 and right 190 button and a select button 188.

Figure 23:
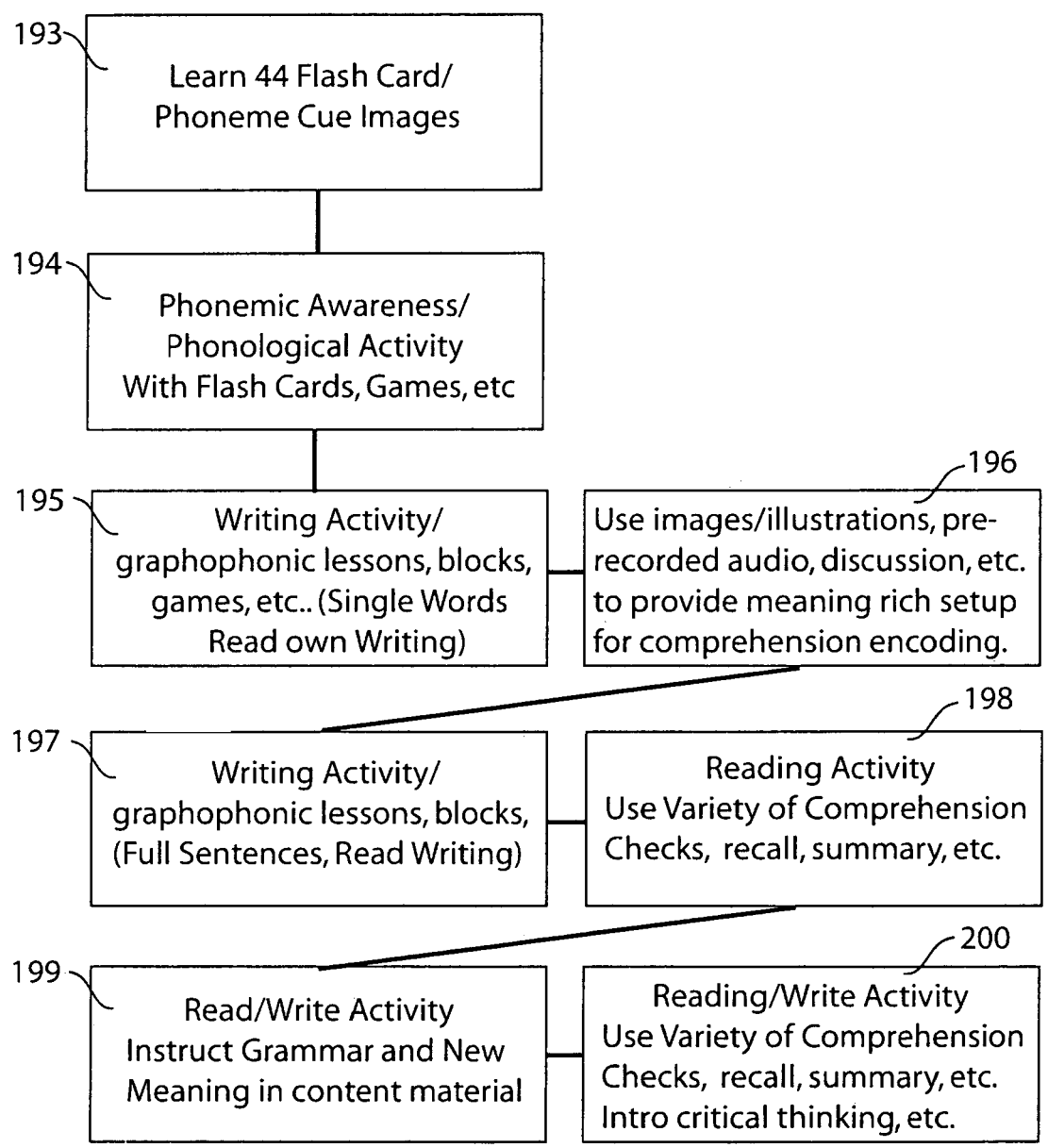
FIG. 23 shows a diagram of the ESCALERA System.

FIG. 23 shows a diagram of the ESCALERA System wherein the Flashcards involving the Phoneme Cue Images are learned 193. Following are phonemic awareness and phonological activities to test and play 194 with the components and processes in oral language. Learners will then advance to encoding 195 using different embodiments of the invention. Meaningful expressions activity 196 will be used to both interest the learner and to gain new knowledge. Writing will advance to fuller expression 197 with self-evaluation of writing by reading one's own writing. With more advanced writing, a variety of comprehension checks 198 will be used to develop post reading learning skills and to encourage readers to look for more meaning in their reading. Formal grammar rules can be instructed in a brisk and forward manner using Graphophonic Blocks if necessary to 199 become aware of language mechanics such as word classes such as nouns, verbs, etc. and new subject material can also be instructed within a semi-independent reading and writing basis. Lastly skills such as 200 summarizing, critical thinking and argument can be explored and instructed.

What is claimed is:

1. A block comprising:
   a multi-sided object representing a general sound, each side of the object including an alternate spelling representing a particular sound at least similar to the general sound;
   a graphical cue representing the particular sound of the alternate spelling; and
   selective indicia to assist with the selection of the alternate spelling that correctly solves a problem.

2. The block of claim 1, wherein the general sound and the particular sound are identical.

3. A method comprising:
   providing multi-sided blocks, each block relating to a particular sound, each side of each block having a text portion, a graphical cue and selective indicia;
   providing a problem containing sound information;
   identifying particular selective indicia;
   selecting a block by comparing the sound information with the graphical cues; and
   selecting a side of the selected block by comparing the particular selective indicia to the indicia on each side of the block.

* * * * *